US009656636B2

(12) United States Patent
Strothmann

(10) Patent No.: US 9,656,636 B2
(45) Date of Patent: May 23, 2017

(54) DRIVE

(76) Inventor: Rolf Strothmann, Saarbrucken (DE)

( * ) Notice: Subject to any disclaimer, the term of this patent is extended or adjusted under 35 U.S.C. 154(b) by 1115 days.

(21) Appl. No.: 13/820,840

(22) PCT Filed: Jul. 26, 2011

(86) PCT No.: PCT/DE2011/075180
§ 371 (c)(1),
(2), (4) Date: Mar. 5, 2013

(87) PCT Pub. No.: WO2012/031590
PCT Pub. Date: Mar. 15, 2012

(65) Prior Publication Data
US 2013/0162114 A1 Jun. 27, 2013

(30) Foreign Application Priority Data
Sep. 7, 2010 (DE) ........................ 10 2010 044 593

(51) Int. Cl.
*B60S 1/58* (2006.01)
*H02K 7/02* (2006.01)
*B60S 1/18* (2006.01)
*B60S 1/24* (2006.01)
*H02K 7/118* (2006.01)
*B60S 1/34* (2006.01)

(52) U.S. Cl.
CPC ............. *B60S 1/583* (2013.01); *B60S 1/18* (2013.01); *B60S 1/245* (2013.01); *H02K 7/02* (2013.01); *H02K 7/118* (2013.01); *B60S 1/3436* (2013.01)

(58) Field of Classification Search
CPC .... H02K 7/02; B60S 1/18; B60S 1/342; B60S 1/3436; B60S 1/0477; B60S 1/0486; B60S 1/341; B60S 1/3418
USPC .... 15/250.3, 250.31, 250.13, 250.16, 250.34, 15/250.001; 310/36, 38
See application file for complete search history.

(56) References Cited

U.S. PATENT DOCUMENTS

| 2,455,089 A | * | 11/1948 | Perez ........................ B60S 1/06 |
| | | | 15/250.3 |
| 4,270,411 A | | 6/1981 | Pengo et al. |
| 6,366,037 B1 | * | 4/2002 | Strothmann ............ H02P 6/185 |
| | | | 318/400.36 |
| 2006/0053577 A1 | * | 3/2006 | Moein ...................... B60S 1/08 |
| | | | 15/250.3 |

FOREIGN PATENT DOCUMENTS

| AU | 459711 A | 4/1975 |
| EP | 0514272 | 11/1992 |
| EP | 1005716 B1 | 2/2010 |
| GB | 2160615 | 12/1985 |

* cited by examiner

*Primary Examiner* — Andrew A Horton
(74) *Attorney, Agent, or Firm* — Lucas & Mercanti, LLP; Klaus P. Stoffel

(57) ABSTRACT

A drive with a motor and devices for coupling the motor to a driving object. The coupling devices include a centrifugal mass which is movable by the motor, and an impact stop, which is connected to the driving object, for the centrifugal mass.

16 Claims, 2 Drawing Sheets

DRIVE

The present application is a 371 of international application PCT/DE2011/075180, filed Jul. 26, 2011, which claims priority of DE 10 2010 044 593.2, filed Sep. 7, 2010, the priority of these applications is hereby claimed and these applications are incorporated herein by reference.

BACKGROUND OF THE INVENTION

The invention relates to a drive with a motor and devices for coupling the motor to a driven object.

SUMMARY OF THE INVENTION

The invention is based on the object of creating a novel drive utilizing a motor which can produce great drive forces for a step-down gear system without much difficulty.

The drive according to the invention which meets this object is characterized in that the coupling devices include a flywheel mass movable by the motor and an impact stop connected to the driven object for the flywheel mass.

Advantageously, when the flywheel mass is abruptly decelerated at the impact stop, an impact force can be created which moves the driven object and may by far exceed the maximum force which the motor produces. A weak motor is sufficient for driving an object which is difficult to move.

Accordingly, to be considered as the driven object is an at least temporarily tightly movable driven object which can be moved by the impacting flywheel mass, or possibly an intermittently movable driven object, for example, a screw which has to be tightened or loosened.

In a particularly preferred embodiment of the invention, the driven object is a driven object which may possibly have to be initially loosened from a state of adherence, for example, a windshield wiper which may be frozen to the windshield. For starting the windshield wiper motor, it does not have to develop a motor force which is sufficient for loosening the state of adherence, but rather the flywheel mass can accelerate with a low operating current, wherein the flywheel mass can then lightly impact against the frozen windshield wiper. The expenditures for motor and control electronics can then also be low.

Advantageously, the flywheel mass is primarily formed by the mass of the rotor.

Advantageously, the aforementioned stop delimits a play in a drive train which connects the rotor to the driven object and can be utilized for the continuous drive of the driven object. In particular, the stop can be delimited by a rotary play ($\alpha$) of a drive shaft connecting the rotor to the driven object. The play permits an acceleration which is unimpaired by the driven object or respectively, a rotary acceleration of the flywheel mass, for example, the rotor or a portion of the drive train.

For loosening a e.g. state of adherence of the driven object, the rotor can be accelerated over a distance which corresponds to the play, or up to a predetermined speed, and then impinges more or less firmly against the stop which delimits the play and is connected to the driven object.

It is understood that the impact forces created at the stop depend upon the properties of the material forming the stop, and that materials can be utilized which dampen the impact more or less strongly in a targeted manner by adjusting the desired impact forces.

Instead of forming the flywheel mass by the rotor of the motor, a separate impact or flywheel mass which can be coupled to the motor could be temporarily provided in exchange for a drive train which permanently drives the driven object.

Advantageously, a device for operating and controlling the motor is provided that determines the position of the rotor, possibly the position of the driven object, and possibly the operating conditions of the motor, and factors in the determined magnitudes in the control of the movement of the motor or the driven object.

Advantageously, in addition to the aforementioned positions and possibly operating currents of the motor, this operating and control device picks up the speed and acceleration of the rotor, possibly by differentiation of the travel position of the rotor over time.

Advantageously, the operating and control device can determine the respective position of the rotor corresponding to the respective stop position of the flywheel mass. This is possible, for example, by means of a test run which makes it possible to determine whether the stop has been reached when appropriately high negative acceleration values or the acceleration zero occur in spite of the increase of the operating current.

In particular, the operating and control device can be provided for detecting the disengagement of the driven object from a state of adherence, wherein kinematic values are also evaluated for this purpose.

In a further development of the invention, when the state of adherence continues, the operating and control device repeats the release procedure, possibly with increased acceleration of the flywheel mass.

The play, which is harmful during continuous driving, can be compensated by the operating and control device by controlling the speed of the rotor in such a way that impacts against the stops are avoided, but the travel through the play distance nevertheless takes place quickly and without long time delays.

In accordance with another advantageous embodiment of the invention, the motor is switched in a star configuration and the operating and control devices for determining the position of the rotor with the aid of an evaluation of the potential at the star point.

In the following, the invention will be further explained with the aid of an embodiment and the enclosed drawing which refers to this embodiment. In the drawing:

DETAILED DESCRIPTION OF THE INVENTION

A windshield wiper 1 on a front windshield 2, for example, of a passenger car, is driven by an electric motor 3. Broken lines 4 and 5 indicate the area of the windshield 2 covered by the wiper blade of the windshield wiper 1. A motor operating and control device 6 produces rotary movements of the motor in alternating directions in accordance with the back and forth movement of the windshield wiper 1.

Figure 1:
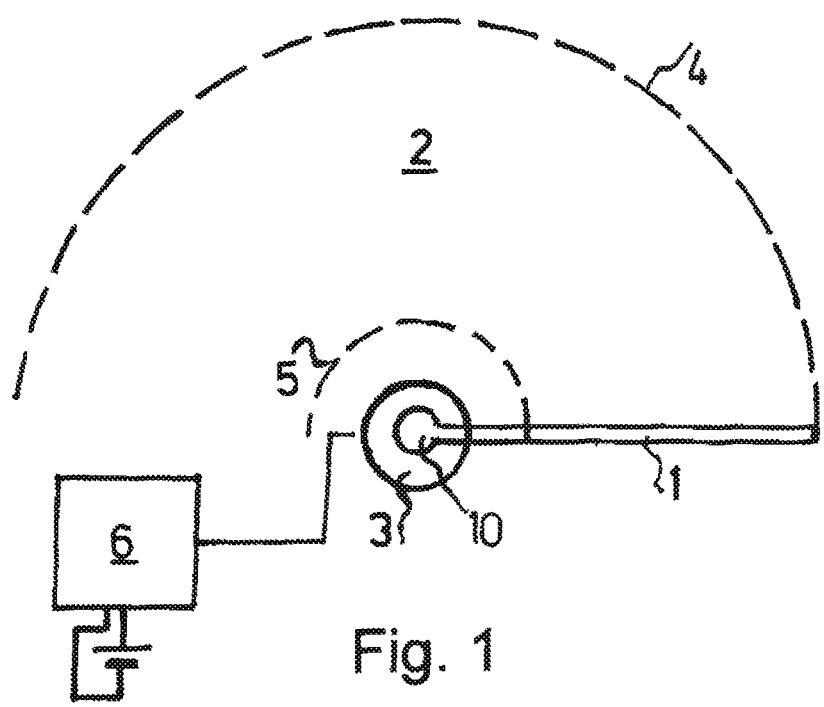
FIG. 1 shows a windshield wiper with a drive according to the invention.
Figure 2:
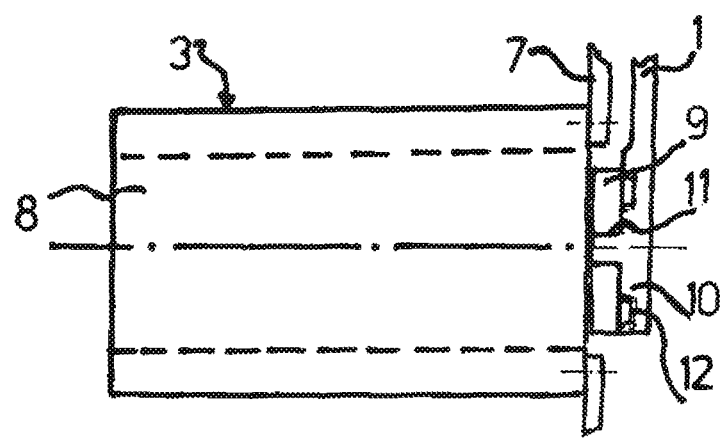
FIG. 2 shows a side view of the windshield wiper motor used in the windshield wiper drive of FIG. 1.

As can be seen in FIG. 2, motor 3 mounted on a sheet metal piece 7 of, for example, a vehicle body, not shown, has an inner rotor 8 which is connected to an axially protruding drive disk 9 extending coaxially with the inner rotor 8. Mounted coaxially on the drive disk 9 is a drive plate 10 of the windshield wiper 1 which rotatably engages with a pin 11 in the drive disk 9 about the pin axis. Two diametrically arranged drive pins 12 protrude from the drive disk 9 into recesses 13 in the drive plate 10.

Figure 3:
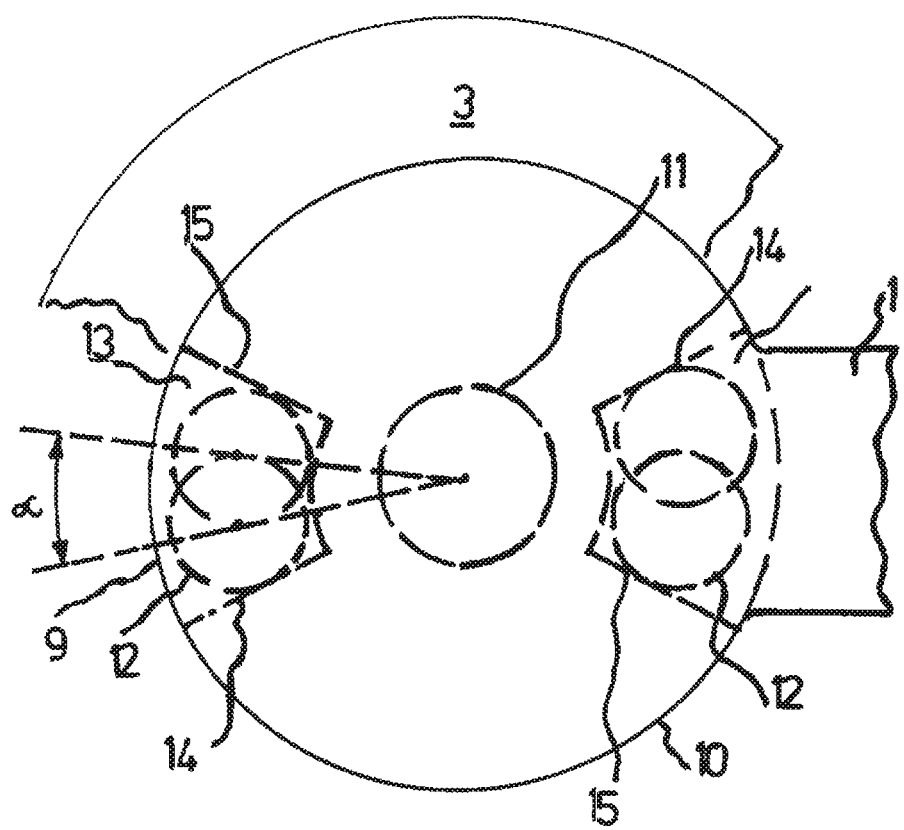
FIG. 3 shows a detail of the windshield wiper motor of FIG. 1.

As can be seen in FIG. 3, the two recesses 13 extend in the circumferential direction of the drive plate 10 over a length which is greater than the diameter of the drive pins 12. Therefore, the drive pins 12 have a play in the recesses 13, and the drive plate 10 can rotate relative to the drive disk 9 over an angle α, wherein oppositely located edges of the recesses 13 each form stops 14 and 15 for the drive pins 12. The motor operating and control device 6 includes a device for determining the rotary angle position of the inner rotor 8, wherein the determination of the angular position takes place in the illustrated embodiment with the aid of an evaluation of the potential at the star point of the motor 3 switched in a star configuration. Such a rotary position determination on the basis of an evaluation of the star point potential is described in EP 1 005 716 B1.

The motor operating and control device 6 further includes devices for determining the angular speed and angular acceleration of the rotor 8 with the aid of a differentiation of the rotary angle over time.

When the operation of the windshield wiper 1 is started the rotor 8 starts moving in one or the other direction of rotation of the windshield wiper 1. The motor operating and control device 6 continuously determines, in addition to the motor operating currents, the angular position, angular speed and angular acceleration of the rotor 8. The motor operating and control device 6 can determine, with the aid of the aforementioned values, whether the drive pins 12 are located between the stops 14, 15 or have reached one of the stops 14, 15. Further, with the aid of the aforementioned values, the motor operating and control device 6 can determine whether or not the drive pins 12 move the windshield wiper 1.

If the drive pins 12 reach the stop 14 or 15 without being able to move the windshield wiper 1 because it adheres too tightly to the windshield 2, the motor operating and control device 6 ensures a backward rotation of the rotor 8 up to the opposite stop, i.e. a return rotation by the angle distance α. From there, the rotor 8 is then strongly accelerated in the forward direction, so that the drive pins 12 impinge more strongly against the respective stop and a disengagement of the state of adherence may take place. If this is not possible, the process can be repeated, possibly with a greater angular acceleration of the rotor 8.

Once the windshield wiper 1 is freed from the state of adherence, the motor 3 can continue to move the windshield wiper 1 with the desired speed by applying the force required for overcoming the sliding friction.

The speed of the rotor 8 at the reversing points of the movement is controlled by the motor operating and control device 6 in such a way that there is no significant impact of the pins 12 against the stops 14 or 15. Accordingly, the play which occurs during normal operation can be compensated without problems by an appropriate control of the rotor 8 and an impact free running of the windshield wiper 1 can be achieved.

The invention claimed is:

1. A drive, comprising: a motor; and coupling devices for coupling the motor to a driven object, wherein the coupling devices comprise a flywheel mass movable by the motor and an impact stop for direct contact with the flywheel mass, the impact stop being connected to the driven object, wherein the impact stop is constructed to produce an impact force which exceeds a maximum force of the motor.

2. The drive according to claim 1, wherein the driven object is a driven object which is at least temporarily difficult to move, and is movable by impact of the flywheel mass.

3. The drive according to claim 1, wherein the driven object is a driven object to be disengaged from a state of adherence.

4. The drive according to claim 3, wherein the driven object is a windshield wiper.

5. The drive according to claim 3, wherein the flywheel mass includes a mass of a rotor of the motor.

6. The drive according to claim 5, wherein the impact stop delimits a play in a drive train that connects the rotor to the driven object and is utilized for continuous drive of the driven object.

7. The drive according to claim 6, wherein the drive train includes a drive shaft that connects the rotor to the driven object, the impact stop delimiting rotary play of the drive shaft.

8. The drive according to claim 5, further comprising an operating and control device for determining position of the rotor, position of the driven object, or states of operation of the motor, for operating and controlling the motor.

9. The drive according to claim 8, wherein the operating and control device is additionally operative to determine speed and/or acceleration of the rotor.

10. The drive according to claim 9, wherein the operating and control device is operative to determine the rotor speed and/or acceleration by differentiation of a path position of the rotor over time.

11. The drive according to claim 8, wherein the operating and control device is operative to determine a respective position of the rotor upon impact of the flywheel mass.

12. The drive according to claim 8, wherein the operating and control device is operative to recognize a disengagement of the driven object from the state of adherence.

13. The drive according to claim 12, wherein the operating and control device is operative to repeat a disengagement operation when the state of adherence continues.

14. The drive according to claim 13, wherein the operating and control device is operative to repeat the disengagement operation with a greater acceleration of the flywheel mass.

15. The drive according to claim 8, wherein the operating and control device is operative to control movement of the rotor after disengagement of the state of adherence with continuous drive and an avoidance of impacts of the flywheel mass against the impact stop.

16. The drive according to claim 8, wherein the motor is switched in a star configuration and the operating and control device is operative to determine the position of the rotor with the aid of an evaluation of a potential at a star point of the star configuration.

* * * * *